(12) United States Patent (10) Patent No.: US 12,609,553 B2
Yamamoto et al. (45) Date of Patent: Apr. 21, 2026

(54) INDEPENDENT OPERATION SYSTEM CONFIGURING DEVICE, INDEPENDENT OPERATION SYSTEM CONFIGURING SYSTEM, AND INDEPENDENT OPERATION SYSTEM CONFIGURING METHOD

(71) Applicant: Hitachi, Ltd., Tokyo (JP)

(72) Inventors: Masashi Yamamoto, Tokyo (JP);
Osamu Tomobe, Tokyo (JP); **Tsutomu
Kawamura, Tokyo (JP); Mingyu Jo**,
Tokyo (JP)

(73) Assignee: Hitachi, Ltd., Tokyo (JP)

( * ) Notice: Subject to any disclaimer, the term of this patent is extended or adjusted under 35 U.S.C. 154(b) by 358 days.

(21) Appl. No.: 18/284,169

(22) PCT Filed: Mar. 14, 2022

(86) PCT No.: PCT/JP2022/011270
§ 371 (c)(1),
(2) Date: Sep. 26, 2023

(87) PCT Pub. No.: WO2022/230397
PCT Pub. Date: Nov. 3, 2022

(65) Prior Publication Data
US 2024/0171002 A1 May 23, 2024

(30) Foreign Application Priority Data
Apr. 27, 2021 (JP) ................................. 2021-075032

(51) Int. Cl.
*H02J 13/12* (2026.01)
*H02J 3/00* (2026.01)

(52) U.S. Cl.
CPC .............. *H02J 13/12* (2026.01); *H02J 3/003* (2020.01)

(58) Field of Classification Search
None
See application file for complete search history.

(56) References Cited

U.S. PATENT DOCUMENTS

2009/0195349 A1* 8/2009 Frader-Thompson ......................
G01D 4/002
340/3.1
2013/0163133 A1 6/2013 Ikawa

FOREIGN PATENT DOCUMENTS

JP 5-316655 A 11/1993
JP 2009-171803 A 7/2009
(Continued)

OTHER PUBLICATIONS

International Search Report (PCT/ISA/210) issued in PCT Application No. PCT/JP2022/011270 dated May 31, 2022 with English translation (4 pages).
(Continued)

*Primary Examiner* — Sean Shechtman
(74) *Attorney, Agent, or Firm* — Crowell & Moring LLP

(57) ABSTRACT
An independent operation system configuring device includes a system configuration plan creation unit that creates a system configuration plan, and an independent operation propriety determination unit that determines propriety of independent operation for each system configuration plan created by the system configuration plan creation unit. This configuration enables selecting a system configuration plan having a maximum load capacity among system configuration plans that allow independent operation.

16 Claims, 11 Drawing Sheets

(56)             References Cited

FOREIGN PATENT DOCUMENTS

| | | | |
|---|---|---|---|
| JP | 2014222980 A | * 11/2014 | ............. Y02A 30/00 |
| JP | 2020-48412 A | 3/2020 | |
| WO | WO 2012/023209 A1 | 10/2013 | |

OTHER PUBLICATIONS

Japanese-language Written Opinion (PCT/ISA/237) issued in PCT Application No. PCT/JP2022/011270 dated May 31, 2022 with English translation (9 pages).

* cited by examiner

| SWITCH NUMBER | ADJACENT SWITCH NUMBER | LOAD CAPACITY | CONSUMER NUMBER | DISPERSED POWER SOURCE NUMBER | ACCIDENT SECTION INFORMATION |
|---|---|---|---|---|---|
| 1 | 2,4 | 20 kVA | #4,#5, #6,#7 | #1 | CLOSE: INTERCHANGEABLE SECTION |
| 1 | 3 | 10 kVA | #1,#2,#3 | - | OPEN: ACCIDENT SECTION |

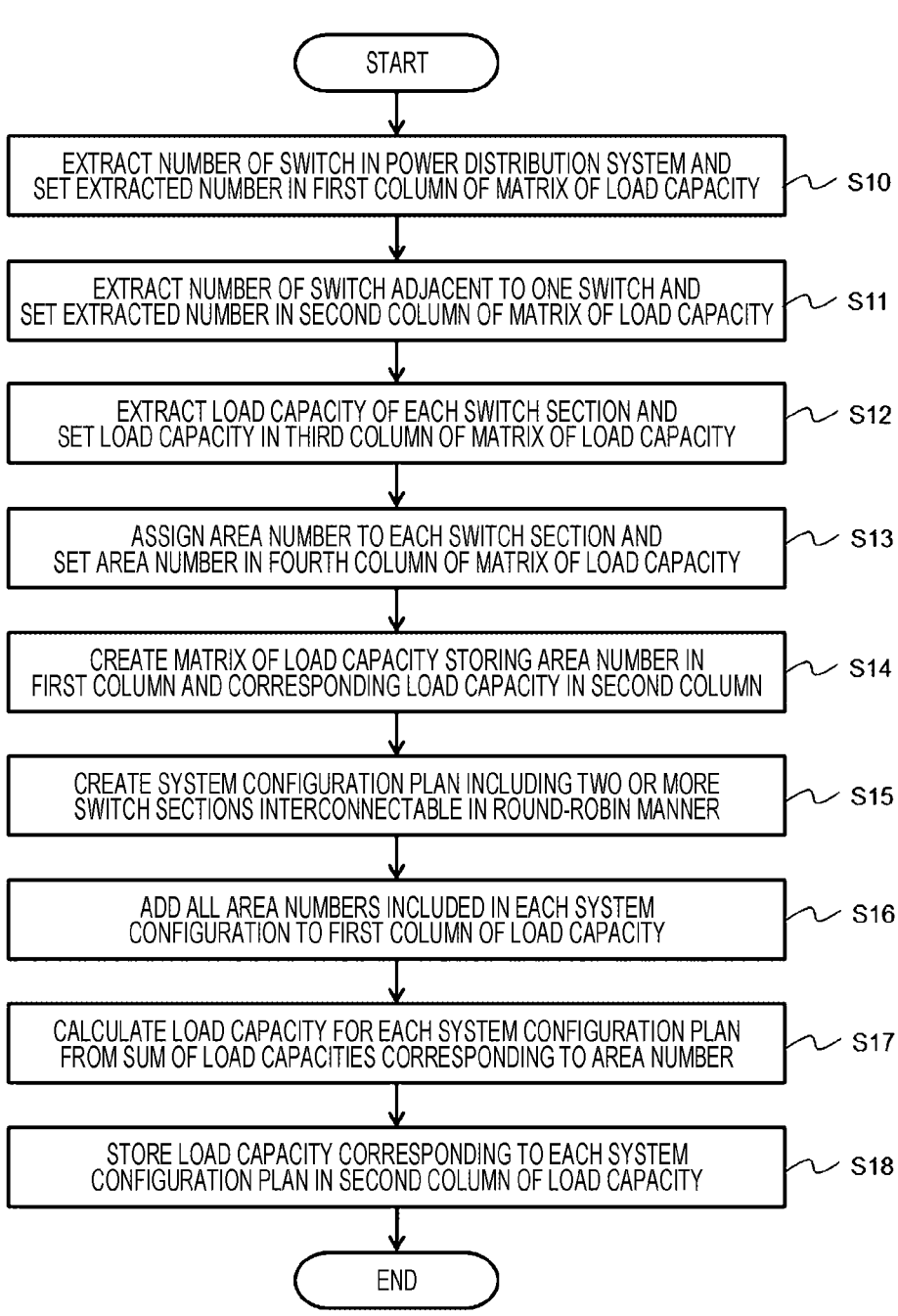

START

EXTRACT NUMBER OF SWITCH IN POWER DISTRIBUTION SYSTEM AND
SET EXTRACTED NUMBER IN FIRST COLUMN OF MATRIX OF LOAD CAPACITY — S10

EXTRACT NUMBER OF SWITCH ADJACENT TO ONE SWITCH AND
SET EXTRACTED NUMBER IN SECOND COLUMN OF MATRIX OF LOAD CAPACITY — S11

EXTRACT LOAD CAPACITY OF EACH SWITCH SECTION AND
SET LOAD CAPACITY IN THIRD COLUMN OF MATRIX OF LOAD CAPACITY — S12

ASSIGN AREA NUMBER TO EACH SWITCH SECTION AND
SET AREA NUMBER IN FOURTH COLUMN OF MATRIX OF LOAD CAPACITY — S13

CREATE MATRIX OF LOAD CAPACITY STORING AREA NUMBER IN
FIRST COLUMN AND CORRESPONDING LOAD CAPACITY IN SECOND COLUMN — S14

CREATE SYSTEM CONFIGURATION PLAN INCLUDING TWO OR MORE
SWITCH SECTIONS INTERCONNECTABLE IN ROUND-ROBIN MANNER — S15

ADD ALL AREA NUMBERS INCLUDED IN EACH SYSTEM
CONFIGURATION TO FIRST COLUMN OF LOAD CAPACITY — S16

CALCULATE LOAD CAPACITY FOR EACH SYSTEM CONFIGURATION PLAN
FROM SUM OF LOAD CAPACITIES CORRESPONDING TO AREA NUMBER — S17

STORE LOAD CAPACITY CORRESPONDING TO EACH SYSTEM
CONFIGURATION PLAN IN SECOND COLUMN OF LOAD CAPACITY — S18

END

| CUSTOMER NUMBER | POWER CONSUMPTION | | | | | | | | | |
|---|---|---|---|---|---|---|---|---|---|---|
| #1 | 0:00 | 0:30 | 1:00 | 1:30 | 2:00 | 2:30 | 3:00 | 3:30 | | ⋮ |
| | 502 W | 539 W | 487 W | 483 W | 432 W | 433 W | 431 W | 428 W | | |
| #2 | 0:00 | 0:30 | 1:00 | 1:30 | 2:00 | 2:30 | 3:00 | 3:30 | | ⋮ |
| | 502 W | 539 W | 487 W | 483 W | 432 W | 433 W | 431 W | 428 W | | |
| ⋮ | | | | | ⋮ | | | | | |

| DISPERSED POWER SOURCE NUMBER | DISPERSED POWER SOURCE OUTPUT | | | | | | | | | |
|---|---|---|---|---|---|---|---|---|---|---|
| #1 | 0:00 | 0:30 | 1:00 | 1:30 | 2:00 | 2:30 | 3:00 | 3:30 | ⋮ |
| | 52 kW | 59 kW | 47 kW | 43 kW | 42 kW | 43 kW | 41 kW | 48 kW | |
| #2 | 0:00 | 0:30 | 1:00 | 1:30 | 2:00 | 2:30 | 3:00 | 3:30 | ⋮ |
| | 52 kW | 59 kW | 47 kW | 43 kW | 42 kW | 43 kW | 41 kW | 48 kW | |
| ⋮ | | | | | ⋮ | | | | |

*FIG. 8*

| | 601 | 602 | 603 | 604 | 605 | 506 | 607 | 608 | 609 |
|---|---|---|---|---|---|---|---|---|---|
| | INDEPENDENT OPERATION START TIME | INDEPENDENT OPERATION END TIME | FREQUENCY ANALYSIS TIME INTERVAL | CURRENT ANALYSIS TIME INTERVAL | SYSTEM CONSTANT | INERTIA CONSTANT | LOAD FREQUENCY CHARACTERISTIC CONSTANT | DISPERSED POWER SOURCE TRIP CRITERION | INDEPENDENT OPERATION PROPRIETY CRITERION |
| 600 | 9/7 10:00 | 9/10 10:00 | 0.1 s | 0.0001 s | 10 %MW/Hz | 10 MW·s | 2 %MW/%Hz | ·CONTINUE UNDER CONDITION WHERE INDEPENDENT OPERATION SYSTEM DURING INDEPENDENT OPERATION PERIOD HAS FREQUENCY DEVIATION WITH MAGNITUDE OF 3.0 Hz OR MORE IN TIME ZONE CONTINUING FOR 1 SECOND OR MORE ... | ·POSSIBLE UNDER CONDITION WHERE INDEPENDENT OPERATION SYSTEM DURING INDEPENDENT OPERATION PERIOD HAS FREQUENCY DEVIATION WITH ROOT MEAN SQUARE (RMS) VALUE WITHIN ±0.2 Hz ... |

1

INDEPENDENT OPERATION SYSTEM CONFIGURING DEVICE, INDEPENDENT OPERATION SYSTEM CONFIGURING SYSTEM, AND INDEPENDENT OPERATION SYSTEM CONFIGURING METHOD

TECHNICAL FIELD

The present invention relates to an independent operation system configuring device, an independent operation system configuring system, and an independent operation system configuring method that support a configuration of an independent operation system while determining whether independent operation can be performed for independent operation operated by a power distribution company or the like.

BACKGROUND ART

In recent years, a dispersed power source such as a renewable energy power supply has been introduced and promoted into a power system. Meanwhile, large-scale disasters such as typhoons and flooding tend to increase, so that cases of large-scale power outage and prolonged restoration due to a trunk system accident and a multiple accident in a power distribution system associated with the large-scale disasters become apparent. Electric power infrastructures are required to address these electric power supply disruptions. For the future, a new operation of a power system is required to implement wide and early power failure recovery and stable power supply thereafter while maximally using dispersed power sources connected to the power system.

In particular, dispersed power sources such as solar power generation have been remarkably introduced and promoted in power distribution systems of power infrastructures, and then independent operation in an emergency has been studied. Meanwhile, the independent operation has an expected problem that power cannot be stably supplied due to a demand in an independent operation system, output of a dispersed power source, and transient phenomenon during the independent operation. This problem causes a need to stably continue the isolated operation in a power distribution system and to maximize the number of customers who recover from a power failure in an emergency.

Examples of a background art of the present technical field include the invention described in PTL 1. PTL 1 includes an abstract stating that "a power conditioner 100 includes a first self-sustained operating output terminal 107 and a second self-sustained operating output terminal 108, an inverter 102, a first current sensor 105 that detects a first current output from the inverter 102, a second current sensor 106 that detects a second current supplied to one of the first self-sustained operating output terminal 107 and the second self-sustained operating output terminal 108, a controller 111 that issues a warning or stops operation of the inverter 102 in a case where the first current is equal to or larger than a predetermined first threshold value or the second current is equal to or larger than a predetermined second threshold value, and a storage unit 109. The controller 111 controls the inverter 102 in accordance with a current flowing through the self-sustained operating output terminal on a lower priority side and a current of a load connected to the self-sustained operating output terminal on a higher priority side".

2

CITATION LIST

Patent Literature

PTL 1: JP 2020-48412 A

SUMMARY OF INVENTION

Technical Problem

The invention described in PTL 1 enables supplying power to a specific load disconnected from a power distribution system while allowing an inrush current using a dispersed power source. Unfortunately, the invention described in PTL 1 is unable to not only determine whether stable power is supplied to a general load in independent operation in the power distribution system, but also maximize a load for recovering from a power failure by the independent operation.

Thus, an object of the present invention is to create a system configuration plan for stably supplying power during independent operation of a power distribution system and maximizing a load capacity for recovering from a power failure.

Solution to Problem

To solve the above problem, an independent operation system configuring device of the present invention includes a system configuration plan creation unit that creates system configuration plans, and an independent operation propriety determination unit that determines propriety of independent operation for each of the system configuration plans created by the system configuration plan creation unit to select a system configuration plan having a maximum load capacity among the system configuration plans allowing the independent operation.

An independent operation system configuring system of the present invention includes a system configuration plan creation unit that creates system configuration plans, and an independent operation propriety determination unit that determines propriety of independent operation for each of the system configuration plans created by the system configuration plan creation unit to select a system configuration plan having a maximum load capacity among the system configuration plans allowing the independent operation.

An independent operation system configuring method of the present invention performs the steps of: creating system configuration plans using a system configuration plan creation unit; and allowing an independent operation propriety determination unit to repeat determination of propriety of independent operation for each of the system configuration plans created by the system configuration plan creation unit to select a system configuration plan having a maximum load capacity among the system configuration plans allowing the independent operation.

Other means will be described in the description of embodiments.

Advantageous Effects of Invention

The present invention enables creating a system configuration plan for stably supplying power during independent operation of a power distribution system and maximizing a load capacity for recovering from a power failure.

BRIEF DESCRIPTION OF DRAWINGS

FIG. 2 is a diagram illustrating an example of load capacity data.

FIG. 4 is a flowchart illustrating processing of a system configuration plan creation unit.

FIG. 5 is a diagram illustrating an example of past demand data.

FIG. 6 is a diagram illustrating an example of past dispersed power source output data.

FIG. 8 is a diagram illustrating an example of a system analysis set value.

DESCRIPTION OF EMBODIMENTS

Hereinafter, embodiments of the present invention will be described in detail with reference to the drawings.

Figure 1:
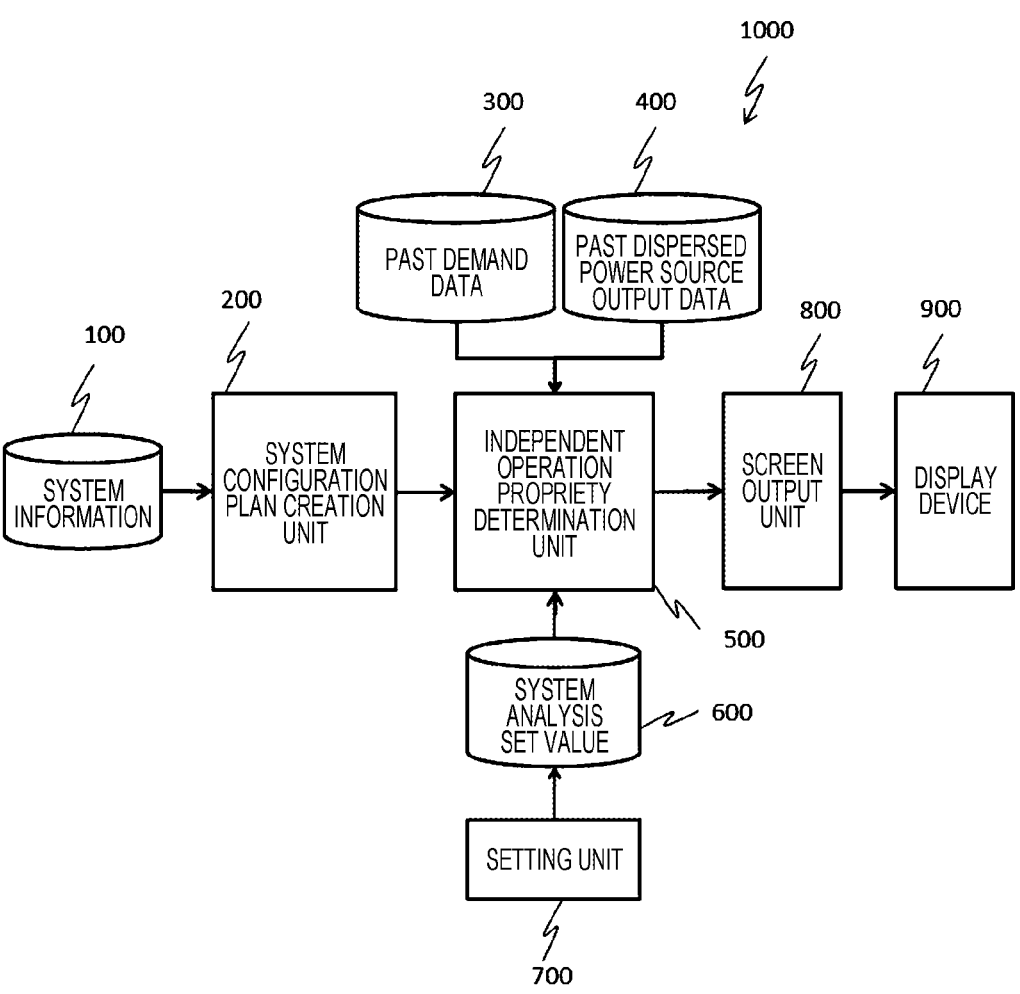
FIG. 1 is a block diagram illustrating an independent operation system configuring device of the present embodiment.

FIG. 1 is a block diagram illustrating an independent operation system configuring device 1000 of the present embodiment.

The independent operation system configuring device 1000 includes a system configuration plan creation unit 200, a system analysis set value setting unit 500, an independent operation propriety determination unit 700, a screen output unit 800, and a display device 900. The independent operation system configuring device 1000 further includes a storage unit (not illustrated) that stores system information 100, past demand data 300, past dispersed power source output data 400, a system analysis set value 600, and an independent operation system configuring program. The independent operation system configuring device 1000 is a computer including a central processing unit (CPU), a random access memory (RAM), and a nonvolatile mass storage unit. The present invention is not limited to a single device, and may be implemented as an independent operation system configuring system in which a plurality of servers and the like cooperate.

The system information 100 indicates a load capacity for each switch section in a power distribution system 101 (see FIG. 3) to be managed by the independent operation system configuring device 1000.

The system configuration plan creation unit 200 is a functional unit that creates a configuration plan of an independent operation system based on the system information 100, and processing thereof will be described later with reference to FIG. 4.

The past demand data 300 is related to past power consumption, and will be described in detail with reference to FIG. 5 described later. The past demand data 300 is input to the independent operation propriety determination unit 700.

The past dispersed power source output data 400 is related to past dispersed power source output, and will be described in detail with reference to FIG. 6 described later. The past dispersed power source output data 400 is input to the independent operation propriety determination unit 700.

The system analysis set value setting unit 500 is a functional unit that sets a set value and the like used for system analysis to the system analysis set value 600, and the processing thereof will be described with reference to FIG. 7 described later.

The system analysis set value 600 is data related to a set value used for system analysis, and will be described in detail with reference to FIG. 8 described later. The system analysis set value 600 is input to the independent operation propriety determination unit 700.

The independent operation propriety determination unit 700 is a functional unit that evaluates system configuration plans created by the system configuration plan creation unit 200 in descending order of load capacity while referring to the past demand data 300, the past dispersed power source output data 400, and the system analysis set value setting unit 500, and that determines whether each of the system configuration plans allows stable independent operation without a repeated power failure. The independent operation propriety determination unit 700 can select a system configuration plan having a maximum load capacity among the system configuration plans allowing independent operation by determining propriety of the independent operation for each of the system configuration plans created by the system configuration plan creation unit. The independent operation propriety determination unit 700 will be described about its configuration and operation with reference to FIG. 9 described later.

The screen output unit 800 is a functional unit that selects and displays contents to be displayed on the display device 900, and processing thereof will be described with reference to FIG. 10 described later.

The display device 900 includes, for example, a liquid crystal panel, an organic electro luminescence (EL) panel, or the like, and displays display contents or the like selected by an operator. The display device 900 displays a screen that will be described with reference to FIG. 11 described later.

FIG. 2 is a diagram illustrating an example of the system information 100.

The system information 100 includes a switch number column 110, an adjacent switch number column 111, a load capacity column 112, a customer number column 113, a dispersed power source number column 114, and an accident section information column 115.

Figure 3:
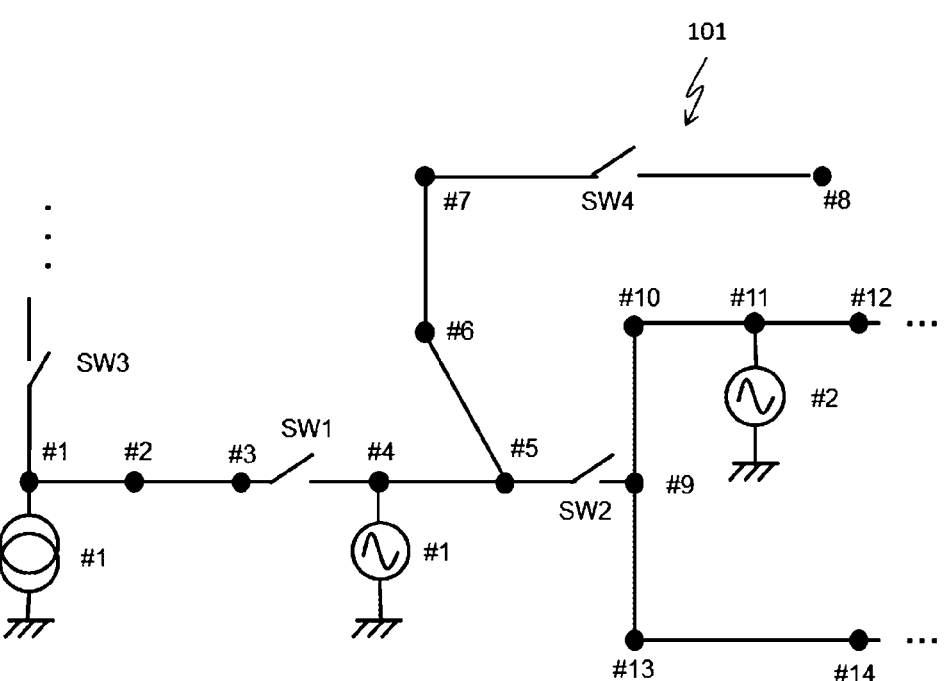
FIG. 3 is a diagram illustrating an example of a power distribution system to be managed.

The switch number column 110 stores information on a serial number for specifying a switch installed in the power distribution system 101 illustrated in FIG. 3. Here, a serial number 1 corresponds to a switch SW1 illustrated in FIG. 3. Hereinafter, serial numbers 2 to 4 correspond to switches SW2 to SW4, respectively.

The adjacent switch number column 111 stores information on serial numbers for specifying all switches adjacent to a switch corresponding to a switch number.

Here, the first row includes the switch number column 110 storing 1, and the adjacent switch number column 111 storing 2 and 4. The first row indicates a single system in which fourth to seventh customers illustrated in FIG. 3 and a first dispersed power source are connected.

The switch number column 110 includes a second row storing 1, and the adjacent switch number column 111 includes the second row storing 3. The second row indicates a single system in which first to third customers and a substation illustrated in FIG. 3 are connected.

The load capacity column 112 stores information on a load capacity of a section divided by adjacent switches. The load capacity column 112 includes the first row storing a sum of the load capacities of the fourth to seventh customers. The load capacity column 112 includes the second row storing a sum of the load capacities of the first to third customers.

The customer number column 113 stores information that is a serial number for identifying a customer of the power distribution system 101 and that indicates the customer present in a switch section. FIG. 3 illustrates each consumer indicated by a black circle and a number such as "#1" adjacent thereto.

The dispersed power source number column 114 stores information that is a serial number for identifying a dispersed power source installed in the power distribution system 101 and that indicates the dispersed power source present in a switch section. The dispersed power source illustrated in FIG. 3 is under a concept including a substation and a dispersed power source.

The accident section information column 115 stores information indicating whether a switch section is opened due to an accident.

FIG. 3 is a diagram illustrating an example of the power distribution system 101 managed by the independent operation system configuring device 1000.

The power distribution system 101 includes first to fourteenth customers, first to second dispersed power sources, a substation, and switches SW1 to SW4. Each consumer is indicated by a node of a black circle and a number such as "#1" or "#2" adjacent thereto.

The first to third customers and the substation are disposed between the switch SW3 and the switch SW1. The first dispersed power source and the fourth to seventh customers are disposed between the switch SW1, and the switch SW2 and the switch SW4. The second dispersed power source and the ninth to fourteenth customers are connected by the switch SW2. The eighth customer is connected by the switch SW4.

The system information 100 illustrated in FIG. 1 is associated with the power distribution system 101 managed by the independent operation system configuring device 1000. The system information 100 indicates positions of a switch, a dispersed power source, and a power distribution substation, for example, and includes a switch number, a dispersed power source number, a number identifying a power distribution substation, and information on a customer number corresponding to a node, for example. The power distribution system 101 managed by the independent operation system configuring device 1000 may have any configuration as long as it is associated with the system information 100, and thus is not limited to the configuration illustrated in FIG. 3. Additionally, each element of the power distribution system 101 managed by the independent operation system configuring device 1000 is associated with position information on a map of a road, a house, and the like.

FIG. 4 is a flowchart illustrating processing of the system configuration plan creation unit 200.

When the processing is started, the system configuration plan creation unit 200 extracts all the switch numbers of the switches in the power distribution system 101 managed by itself from the system information 100, and sets the extracted switch numbers in a first column of a matrix of load capacity (step S10).

After that, the system configuration plan creation unit 200 extracts the switch numbers of all the switches adjacent to the switches corresponding to the switch numbers in the first column from the system information 100, sets the extracted switch numbers in a second column of the matrix of load capacity to identify all switch sections (step S11).

Then, the system configuration plan creation unit 200 extracts load capacity of each of the switch sections from the system information 100 and sets the load capacity in a third column of the matrix (step S12).

Subsequently, the system configuration plan creation unit 200 assigns an area number such as an area 1 or an area 2 to each of the switch sections and sets the area number in a fourth column of the matrix of load capacity (step S13). These steps enable the area number to collectively identify the load capacity of each of the switch sections, the switch number of the switch necessary for configuring each of the switch sections, and adjacent switch sections, or switch sections divided by an identical switch.

Subsequently, the system configuration plan creation unit 200 creates a matrix of load capacity in which each area number is stored in a first column and load capacity of a corresponding switch section is stored in a second column (step S14).

Subsequently, the system configuration plan creation unit 200 defines a variable that can take a natural number from 2 to a maximum value of the area number as n, for example, and sequentially changes n from 2 to the maximum value of the area number to create a system configuration plan including one or more switch sections and n switch sections adjacent to each other in a round-robin manner (step S15). That is, the system configuration plan creation unit 200 creates a system configuration plan by combining switch states.

Then, the system configuration plan creation unit 200 sequentially adds all the area numbers included in each system configuration to the first column of the matrix of load capacity (step S16). As a result, the system configuration plan creation unit 200 creates all system configuration plans including a system configuration plan based on only one switch section and a system configuration plan based on only a switch section that is always adjacent to, or interconnectable with, one or more switch sections, and all the system configuration plans can be identified by respective combinations of area numbers.

Subsequently, the system configuration plan creation unit 200 calculates load capacities of the respective system configuration plans from a sum of load capacities corresponding to respective area numbers (step S17), and stores the load capacities in the second column of the matrix of load capacity (step S18), and then ends the processing of FIG. 4. These steps enable the load capacity of each system configuration to be referred to from others. The system configuration plan creation unit 200 operates as a functional unit that creates a plurality of system configuration plans different in configuration of a load and/or a power source.

FIG. 5 is a diagram illustrating an example of the past demand data 300.

The past demand data 300 includes a customer number column 301 and a power consumption column 302.

The customer number column 301 stores a serial number for identifying a customer of the power distribution system 101 managed by the customer itself, and stores the same information as that on the customer number of the system information 100. The power consumption column 302 stores past time-series data related to usage of electric power of a consumer measured by a smart meter owned by an electric power company, for example. The power consumption column 302 may include an output of a dispersed power source such as low-voltage solar power generation.

FIG. 6 is a diagram illustrating an example of the past dispersed power source output data 400.

The past dispersed power source output data 400 includes a dispersed power source number column 401 and a dispersed power source output column 402.

The dispersed power source number column 401 stores a serial number for identifying a dispersed power source to be managed of the power distribution system 101, and the same information as that on the dispersed power source number of the system information 100. The dispersed power source output column 402 is past time-series data related to an output of a dispersed power source owned by an electric power company, for example, and is time-series data on an output of high-voltage solar power generation or a system storage battery system, for example.

Figure 7:
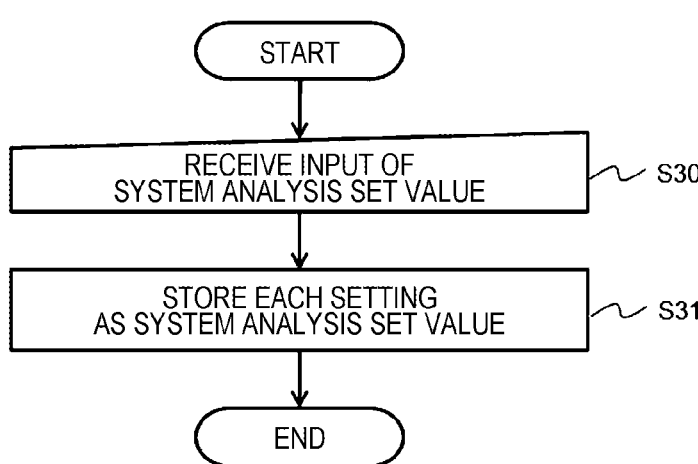
FIG. 7 is a flowchart illustrating processing of a system analysis set value setting unit.

FIG. 7 is a flowchart illustrating processing of the system analysis set value setting unit 500.

When the processing is started, the system analysis set value setting unit 500 receives an input of setting information constituting the system analysis set value 600 (step S30). The setting information includes an independent operation start time, an independent operation end time, a frequency analysis time interval, a current analysis time interval, a system constant, an inertia constant, a load frequency characteristic constant, a dispersed power source trip criterion, and an independent operation propriety criterion, for example.

Subsequently, the system analysis set value setting unit 500 stores the setting information received as the system analysis set value 600 (step S31), and then ends the processing of FIG. 7. The system analysis set value setting unit 500 functions as a setting unit that sets a trip criterion of a dispersed power source or an independent operation propriety criterion.

FIG. 8 is a diagram illustrating an example of the system analysis set value 600.

The system analysis set value 600 includes an independent operation start time column 601, an independent operation end time column 602, a frequency analysis time interval column 603, a current analysis time interval column 604, a system constant column 605, an inertia constant column 606, a load frequency characteristic constant column 607, a dispersed power source trip criterion column 608, and an independent operation propriety criterion column 609.

The independent operation start time column 601 stores a scheduled time to start independent operation.

The independent operation end time column 602 stores a scheduled time at which the independent operation ends.

The frequency analysis time interval column 603 stores a time interval in a simulation for analyzing a system frequency of an independent operation system.

The current analysis time interval column 604 stores a time interval in a simulation for analyzing a current flowing through an independent operation system.

The system constant column 605 stores a system constant of an independent operation system.

The inertia constant column 606 stores an inertia constant of an independent operation system.

The load frequency characteristic constant column 607 stores a load frequency characteristic constant of an independent operation system.

The dispersed power source trip criterion column 608 stores a criterion by which a dispersed power source trips in the independent operation propriety determination unit 700 described later. Examples of the criterion by which a dispersed power source trips include a time zone in which an independent operation system during an independent operation period has a frequency deviation with a magnitude of 3.0 Hz or more, the time zone continuing for 1 second or more, and a time zone in which an output current of a dispersed power source exceeds a rated current of the dispersed power source, the time zone continuing for 1 second or more.

The independent operation propriety criterion column 609 stores a criterion for determining whether independent operation is possible or impossible in the independent operation propriety determination unit 700. Examples of the criterion for determining that independent operation is possible include a case where an independent operation system during an independent operation period has a frequency deviation with a root mean square (RMS) value within ±0.2 Hz.

Figure 9:
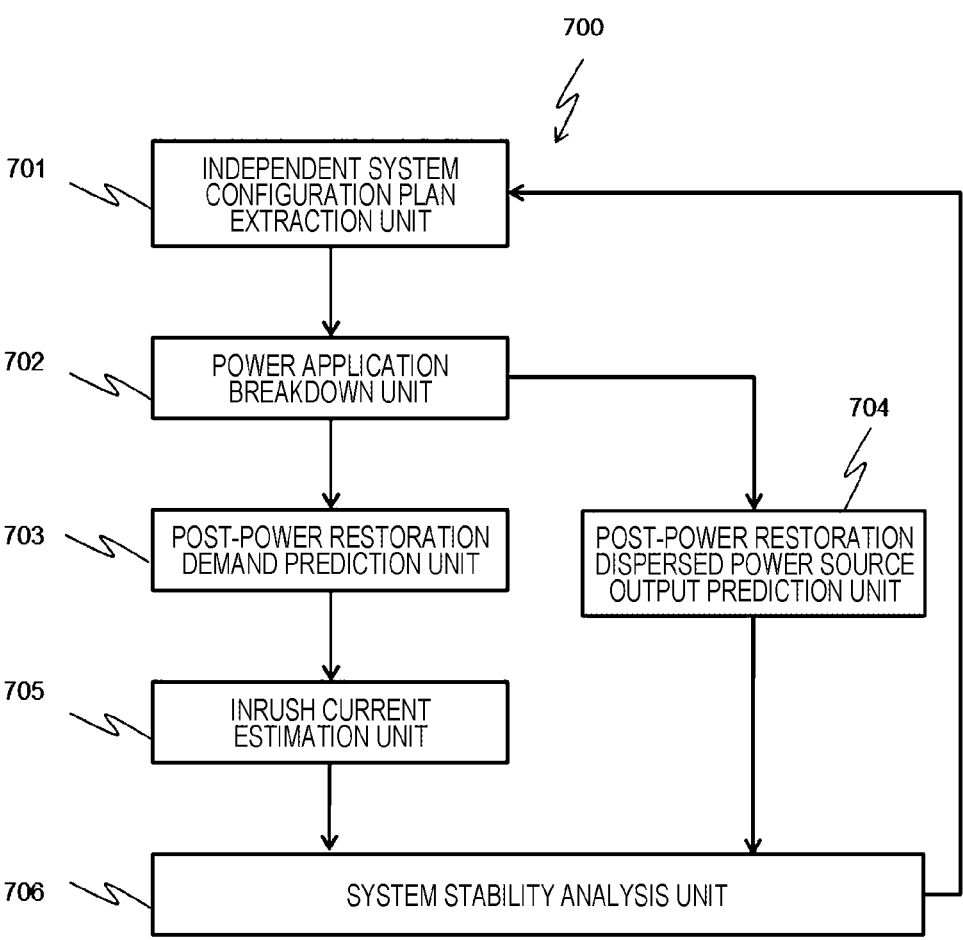
FIG. 9 is a block diagram illustrating a configuration and an operation of an independent operation propriety determination unit.

FIG. 9 is a block diagram illustrating a configuration and operation of the independent operation propriety determination unit 700.

The independent operation propriety determination unit 700 includes an independent system configuration plan extraction unit 701, a power application breakdown unit 702, a post-power restoration demand prediction unit 703, a post-power restoration dispersed power source output prediction unit 704, an inrush current estimation unit 705, and a system stability analysis unit 706. The independent operation propriety determination unit 700 determines propriety of independent operation for each of the plurality of system configuration plans, and enables selection of a system configuration plan having a maximum load capacity among the system configuration plans in which the independent operation can be stably performed.

The independent system configuration plan extraction unit 701 first refers to the matrix of load capacity for each system configuration plan from the system configuration plan creation unit 200, and extracts the system configuration plan having the maximum load capacity. Subsequently, the independent system configuration plan extraction unit 701 extracts past demand data in the system configuration plan extracted.

The power application breakdown unit 702 breaks down the past demand data in the system configuration plan extracted by the independent system configuration plan extraction unit 701 into past demand data (power data for each application) for each load type such as lighting or air conditioning, and past output data (application-specific power data) on a dispersed power source such as low-voltage solar power generation.

The post-power restoration demand prediction unit 703 predicts power demand for each load type after power restoration using the past demand data (power data for each application) on each of the load types broken down by the power application breakdown unit 702 or using both the past demand data (power data for each application) on each load type and regression analysis.

The post-power restoration dispersed power source output prediction unit 704 predicts output of a dispersed power source after the power restoration based on the past output data on the dispersed power source broken down by the power application breakdown unit 702 by regression analysis, for example.

The inrush current estimation unit 705 sets parameters such as a transformer model, a load model, and a contracted load model in the system model in time series based on the predicted demand for each load type after the power restoration, and simulates an inrush current that flows in the independent operation system after the power restoration at current analysis time intervals set to the system analysis set value 600, the inrush current being characteristic for each load type.

As a result, the inrush current estimation unit 705 can estimate a current flowing through the independent operation system after the power restoration while considering the system configuration plan and inrush currents of the transformer and the load, the inrush currents changing with time.

When the system analysis set value 600 includes the dispersed power source trip criterion for a current, the inrush current estimation unit 705 also trips a dispersed power source at a time when the criterion is satisfied in the simulation. Thus, the inrush current estimation unit 705 can estimate a time when the dispersed power source is tripped due to inrush currents of the transformer and the load. The inrush current estimation unit 705 models and simulates each of loads such as a transformer, lighting, and air conditioning using an equivalent circuit.

The inrush current estimation unit 705 also models transformers and loads of all systems, for example, on the assumption that all general consumers have an equal number of loads that are identical in type, for example. After that, the inrush current estimation unit 705 tunes the parameters of the transformer and the load model to have similar simulation results before and after the contraction. As a result, the inrush current estimation unit 705 can reduce a calculation time by contracting the transformer and the load model.

The system stability analysis unit 706 simulates supply and demand frequency stability at frequency analysis time intervals set to the system analysis set value 600, for example, based on a demand prediction for each load type after the power restoration, an output prediction for a dispersed power source, and an estimation result of an inrush current. When the system analysis set value 600 includes a dispersed power source trip criterion for frequency, for example, the system stability analysis unit 706 trips the dispersed power source at a time when the criterion is satisfied in the simulation. As a result, the system stability analysis unit 706 can simulate the trip of the dispersed power source due to time change of frequency deviation and deviation from frequency.

Subsequently, the system stability analysis unit 706 determines propriety of independent operation on the independent operation system configuration plan extracted by the independent system configuration plan extraction unit 701 based on the independent operation propriety criterion set to the system analysis set value 600, and stores information on combinations of system configuration plans, load capacity, and propriety of independent operation.

Then, the independent system configuration plan extraction unit 701 extracts a system configuration plan having the next maximum load capacity after the system configuration plan determined immediately before from the matrix of load capacities. Thereafter, the independent operation propriety determination unit 700 repeats a series of processes, and ends the series of processes when determining propriety of independent operation on a system configuration plan having the smallest load capacity. The information on combinations of system configuration plans, load capacity, and propriety of independent operation allows a user to select a system configuration plan having the maximum load capacity among the system configuration plans in which the independent operation can be stably performed. The user is also allowed to know propriety of independent operation on each system configuration plan.

Figure 10:
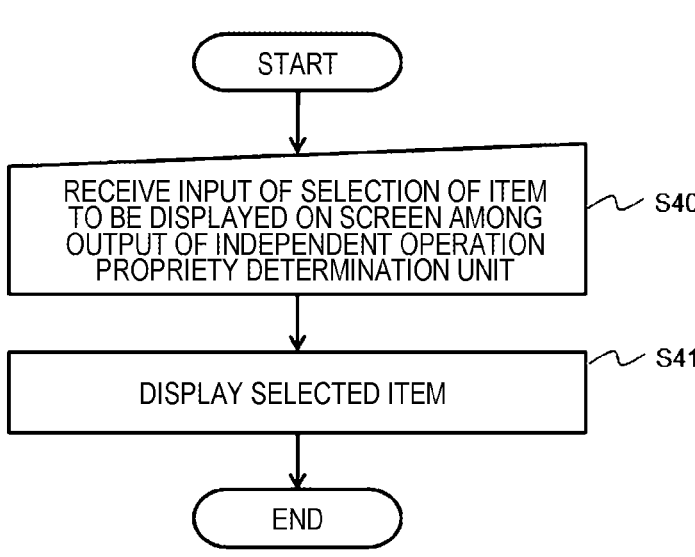
FIG. 10 is a flowchart illustrating processing of a screen output unit.

FIG. 10 is a flowchart illustrating processing of the screen output unit 800.

The screen output unit 800 displays buttons and pull-down, for example, in a display content selection pane 911 (see FIG. 11) on the display device 900 described later. When an operator presses or selects one or more of the buttons, the pull-down, and the like displayed on the display device 900, the screen output unit 800 outputs a display content selected by the operator to another pane displayed on the display device 900.

Examples of the display content that can be selected at this time include an independent operation system plan created by the system configuration plan creation unit 200, a switch state for each system configuration plan, a power supply area for each system configuration plan, accident point information, a map of a road, a house, or the like, each setting of a dispersed power source trip criterion, an independent operation propriety criterion, and the like appropriately set by the operator using the system analysis set value setting unit 500, the graph regarding predicted demand for each load type, a graph of predicted output of a dispersed power source, a graph of any one of a current flowing in a system including the inrush current, a system frequency deviation, and a system frequency, a load capacity for each system configuration plan, a determination result of propriety of independent operation for each system configuration plan, a root-mean-square value of frequency for each system configuration plan, and an optimal system configuration plan.

The screen output unit 800 also may output each setting of the dispersed power source trip criterion and the independent operation propriety criterion set by a setting unit in system analysis to the screen. Here, the optimum system configuration plan refers to a system configuration plan having a maximum load capacity among system configuration plans determined to allow independent operation. The screen output unit 800 displays a display content selected by the operator through the display content selection pane 911 of a screen 910 illustrated in FIG. 11 in another pane of the screen 910.

Figure 11:
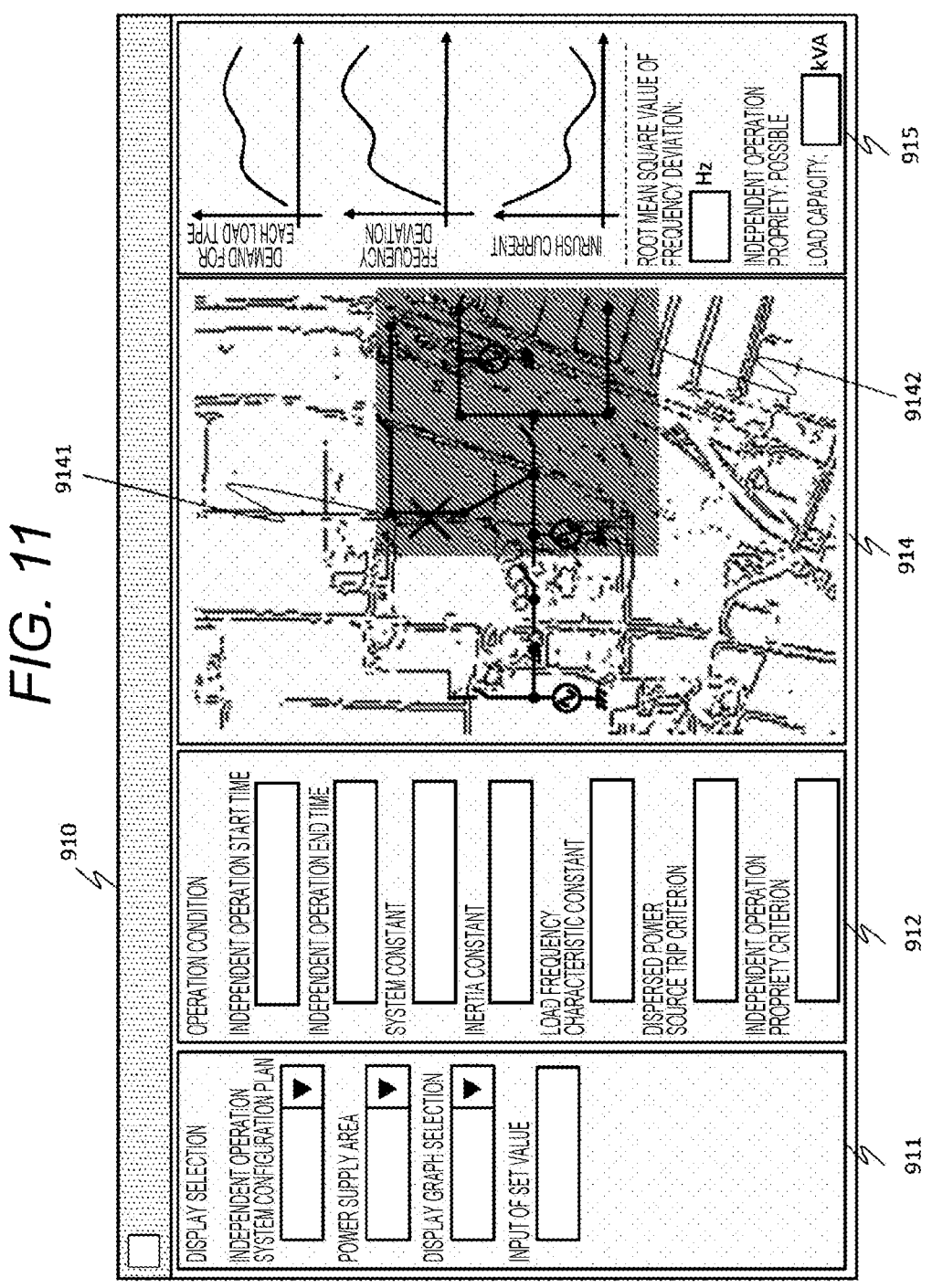
FIG. 11 is an example of a screen output by a screen output unit.

FIG. 11 illustrates the screen 910 output by the screen output unit 800.

The screen 910 is displayed on the display device 900, and displays a display content selected by the screen output unit 800 as illustrated in FIG. 11, for example.

The display content selection pane 911 is a display for the operator to operate and select a display content to be selected and processed by the screen output unit 800. As a result, the display content selected in the display content selection pane 911 is displayed in another pane.

Each setting appropriately set by the operator is displayed in an analysis condition pane 912. The analysis condition pane 912 displays information constituting the system analysis set value 600, for example. FIG. 11 shows independent operation start time, independent operation end time, a system constant, an inertia constant, a load frequency characteristic constant, a dispersed power source trip criterion, an independent operation propriety criterion, and the like.

In a map pane 914, a system configuration plan and a map of a road, a house, or the like, the map corresponding to the system configuration plan in positional relationship, are displayed in a superimposed manner. The system configuration plan is a system diagram colored to enable each system to be identified. The system diagram displays not only switches in an open state and a closed state, the switches being color-coded to indicate a switch state in the system, for example, but also a position of an accident point 9141 using a symbol such as a cross, for example. For example, an area 9142 to which power is supplied by independent operation is colored and displayed on the map.

An analysis result pane 915 displays a simulation result related to independent operation corresponding to a system configuration plan stored in the independent operation propriety determination unit 700. FIG. 11 shows the simulation result indicated by: a graph related to predicted demand for each load type; a graph related to frequency or frequency deviation of an independent operation system; a graph related to a current flowing through the independent operation system, the current including an inrush current; a root mean square value of the frequency deviation for each independent operation system; a load capacity for each configuration plan for a system or the like; and an independent operation propriety determination result for each system configuration plan. However, the simulation result in the analysis result pane 915 is not limited thereto, and may be a graph related to predicted output of a dispersed power source, for example.

The simulation result is displayed according to a system configuration plan. However, when an optimum system configuration plan is selected to be displayed by the screen output unit 800, the screen 910 displays a display content corresponding to a system configuration plan having a maximum load capacity among independent operation system configuration plans determined to allow independent operation, for example.
(Modification)

The present invention is not limited to the embodiments described above, and includes various modifications. For example, the embodiments described above have been described in detail to describe the present invention in an easy-to-understand manner, and are not necessarily limited to those having all the configurations described. A part of a configuration of one embodiment can be replaced with a configuration of another embodiment, and the configuration of the other embodiment can be added to the configuration of the one embodiment. Additionally, addition, deletion, and replacement of another configuration is allowed for a part of a configuration of each embodiment.

Some or all of the configurations, functions, processing units, processing means, and the like described above may be implemented by hardware such as an integrated circuit, for example. The configurations, functions, and the like described above may be implemented by software using a processor interpreting and executing a program for implementing each function. Information such as a program, a table, and a file for implementing each function can be stored in a recording device such as a memory, a hard disk, or a solid state drive (SSD), or a recording medium such as a flash memory card or a digital versatile disk (DVD).

Each embodiment indicates control lines and information lines that are considered to be necessary for the description, and thus all control lines and information lines are not necessarily indicated in a product. In practice, almost all the configurations may be considered to be connected to each other.

REFERENCE SIGNS LIST 1000 independent operation system configuring device
100 system information
101 power distribution system
110 switch number column
111 adjacent switch number column
112 load capacity column 113 customer number column
114 dispersed power source number column
115 accident section information column
200 system configuration plan creation unit
300 past demand data
301 customer number column
302 power consumption column
400 past dispersed power source output data
401 dispersed power source number column
402 dispersed power source output column
500 system analysis set value setting unit (setting unit)
600 system analysis set value
601 independent operation start time column
602 independent operation end time column
603 frequency analysis time interval column
604 current analysis time interval column
605 system constant column
606 inertia constant column
607 load frequency characteristic constant column
608 dispersed power source trip criterion column
609 independent operation propriety criterion column
700 independent operation propriety determination unit
701 independent system configuration plan extraction unit
702 power application breakdown unit
703 post-power restoration demand prediction unit (load type demand prediction unit)
704 post-power restoration dispersed power source output prediction unit
705 inrush current estimation unit
706 system stability analysis unit
800 screen output unit
900 display device
910 screen
911 display content selection pane
912 analysis condition pane
914 map pane
915 analysis result pane

The invention claimed is:

1. An independent operation system configuring device configured to manage a power distribution system, the independent operation system configuring device comprising:
   a non-transitory computer-readable medium storing a program including instructions for controlling the independent operation system configuring device; and
   a processor configured to execute the instructions, which causes the processor to:
   create system configuration plans;
   determine propriety of independent operation for each of the system configuration plans and select a system configuration plan having a maximum load capacity among the system configuration plans allowing the independent operation;
   estimate an inrush current being characteristic for each load type using a load model or a contracted load model; and
   control supply of power to the power distribution system according to the selected system configuration plan;
   wherein the processor outputs the selected system configuration plan to a screen; and
   wherein the processor outputs a load capacity, an independent operation propriety determination result, and a root mean square value of a frequency deviation to the screen for each of the system configuration plans.

2. The independent operation system configuring device according to claim 1, wherein the processor creates a plurality of system configuration plans different in configuration of a load and/or a power source, and the processor determines propriety of independent operation for each of the plurality of system configuration plans.

3. The independent operation system configuring device according to claim 1, wherein the processor is configured to determine a system configuration plan having a maximum load capacity among system configuration plans that allow stable independent operation.

4. The independent operation system configuring device according to claim 1, wherein the processor is further configured to:

break down a power application; and predict power demand for each load type using power data for each application broken down by the power application breakdown unit.

5. The independent operation system configuring device according to claim 4, wherein the processor predicts power demand for each load type using the power data for each application broken down by the power application breakdown unit or using both the power data for each application and regression analysis.

6. The independent operation system configuring device according to claim 1, wherein the processor sets parameters of a transformer model and/or a load model in a system model in time series based on a predicted demand for each load type after power restoration.

7. The independent operation system configuring device according to claim 1, wherein the processor creates a system configuration plan using a combination of switch states.

8. The independent operation system configuring device according to claim 1, wherein the processor calculates a matrix of load capacity for each independent operation system configuration plan.

9. The independent operation system configuring device according to claim 1, wherein the processor sets a trip criterion of a dispersed power source or an independent operation propriety criterion.

10. The independent operation system configuring device according to claim 9, wherein the processor determines propriety of independent operation based on the trip criterion of the dispersed power source.

11. The independent operation system configuring device according to claim 1, wherein the processor outputs a switch state for each of system configuration plans and/or a power supply area for each of the system configuration plans to the screen.

12. The independent operation system configuring device according to claim 1, wherein the processor outputs a map of a power distribution system to be managed and accident point information to the screen.

13. The independent operation system configuring device according to claim 1, wherein the processor outputs each setting of a dispersed power source trip criterion and/or an independent operation propriety criterion to the screen.

14. The independent operation system configuring device according to claim 1, wherein the processor outputs any one of graphs to the screen for each system configuration plan, the graphs including: a graph related to predicted demand for each load type; a graph related to predicted output of a dispersed power source; and a graph related to any one of a current flowing through a system and including an inrush current, a system frequency deviation, and a system frequency.

15. The independent operation system configuring device according to claim 1, wherein the processor outputs a system configuration plan having a maximum load capacity among system configuration plans determined to allow independent operation to the screen.

16. An independent operation system configuring method for managing a power distribution system, the method comprising:

creating system configuration plans using a system configuration plan creation unit;

allowing an independent operation propriety determination unit to repeat determination of propriety of independent operation for each of the system configuration plans created by the system configuration plan creation unit to select a system configuration plan having a maximum load capacity among the system configuration plans allowing the independent operation;

estimating an inrush current being characteristic for each load type using a load model or a contracted load model by an inrush current estimation unit;

controlling supply of power to the power distribution system according to the selected system configuration plan;

outputting the selected system configuration plan to a screen; and outputting a load capacity, an independent operation propriety determination result, and a root mean square value of a frequency deviation to the screen for each of the system configuration plans.

\* \* \* \* \*